US011947293B2

(12) United States Patent
Takatsuka

(10) Patent No.: US 11,947,293 B2
(45) Date of Patent: Apr. 2, 2024

(54) FUSING DEVICE AND IMAGE FORMING APPARATUS PROVIDED WITH THE SAME

(71) Applicant: SHARP KABUSHIKI KAISHA, Sakai (JP)

(72) Inventor: Kazuki Takatsuka, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/955,991

(22) Filed: Sep. 29, 2022

(65) Prior Publication Data

US 2023/0121896 A1 Apr. 20, 2023

(30) Foreign Application Priority Data

Oct. 14, 2021 (JP) ................................ 2021-168828

(51) Int. Cl.
*G03G 15/20* (2006.01)

(52) U.S. Cl.
CPC ..... *G03G 15/2053* (2013.01); *G03G 15/2064* (2013.01); *G03G 2215/2038* (2013.01)

(58) Field of Classification Search
CPC ....................... G03G 15/2053; G03G 15/2064
USPC ................................ 399/122, 320, 328, 329
See application file for complete search history.

(56) References Cited

U.S. PATENT DOCUMENTS 8,406,647 B2 * 3/2013 Shinshi ............. G03G 15/2039 399/329
9,244,411 B2 * 1/2016 Seshita .............. G03G 15/2053
9,389,557 B1 * 7/2016 Himeno ............. G03G 15/2042
2016/0349675 A1 12/2016 Yamamoto et al.

FOREIGN PATENT DOCUMENTS

JP 2016-224200 A 12/2016

* cited by examiner

*Primary Examiner* — Hoan H Tran
(74) *Attorney, Agent, or Firm* — ScienBiziP, P.C.

(57) ABSTRACT

A fusing device includes: an endless rotatable fusing belt; a nip forming member that is disposed on an inner circumferential surface of the fusing belt; a pressure roller that is in pressure contact with the nip forming member from an outer side of the fusing belt and forms a fusing nip area between the pressure roller and the fusing belt; and a heat source that is disposed inside the fusing belt and heats the fusing belt. The fusing device further includes a heat-conductive member that is disposed on a lateral side of an outer circumference of the fusing belt. The heat-conductive member extends over a width area in a rotation axis direction of the fusing belt.

19 Claims, 7 Drawing Sheets

FUSING DEVICE AND IMAGE FORMING APPARATUS PROVIDED WITH THE SAME

BACKGROUND OF THE INVENTION

Field of the Invention

The present disclosure relates to a fusing device and an image forming apparatus.

Description of the Background Art

The following fusing device has been known. In the fusing device, a pressure roller is in pressure contact with an outer side of an endless rotatable fusing belt, a fusing nip area is formed between the fusing belt and the pressure roller, a sheet is heated in the fusing nip area, and a toner image is thereby fused onto the sheet.

Such a fusing belt is heated by a heat source that is disposed inside the fusing belt. In recent years, a reduction in heat capacity (rapid heating) of the fusing belt has been requested from a viewpoint of energy saving.

However, the above related art has a problem of being insufficient to avoid a situation where the fusing belt is overheated by the heat source.

The present disclosure has been made to solve the above conventional problem and therefore has a purpose of providing a fusing device capable of suppressing overheating of a fusing belt and providing an image forming apparatus provided with the fusing device.

SUMMARY OF THE INVENTION

In order to achieve the above purpose, a fusing device disclosed in the present disclosure is a fusing device that includes: an endless rotatable fusing belt; a nip forming member that is disposed on an inner circumferential surface of the fusing belt; a pressure roller that is in pressure contact with the nip forming member from an outer side of the fusing belt and forms a fusing nip area between the pressure roller and the fusing belt; and a heat source that is disposed inside the fusing belt and heats the fusing belt. The fusing device further includes a heat-conductive member that is disposed on a lateral side of an outer circumference of the fusing belt. The heat-conductive member extends over a width area in a rotation axis direction of the fusing belt.

In the fusing device, the heat-conductive member may be disposed on an extension line of an imaginary straight line or near the extension line, the imaginary straight line connecting the heat source and the fusing belt by the shortest distance.

In the fusing device, the heat-conductive member may be dispose on an imaginary straight line or near the imaginary straight line that connects the heat source and the fusing belt by the shortest distance at any position in the rotation axis direction of the fusing belt.

The fusing device further includes a thermostat that shuts off electric power supply to the heat source when a temperature of the fusing belt becomes a predetermined temperature. The heat-conductive member may have an opening, and the thermostat may be provided at a position facing the opening.

In the fusing device, the thermostat may be provided on an extension line of an imaginary straight line or near the extension line, the imaginary straight line connecting the heat source and the fusing belt by the shortest distance.

In the fusing device, the heat-conductive member may be constructed of plural members that are formed of mutually different materials.

The fusing device further includes a fusing frame that rotatably supports both ends of the fusing belt. The fusing frame may have a plate that is disposed along the rotation axis direction of the fusing belt, and the heat-conductive member may be disposed between the fusing belt and the plate.

In the fusing device, the heat-conductive member may integrally be formed with the fusing frame.

The fusing device further includes a fusing frame that rotatably supports both ends of the fusing belt. The fusing frame may have a plate that is disposed on the lateral side of the outer circumference of the fusing belt, and the plate of the fusing frame may extend over the width area in the rotation axis direction of the fusing belt and function as the heat-conductive member.

The fusing device further includes a fusing frame that rotatably supports both ends of the fusing belt. The fusing frame may have a plate that is disposed along the rotation axis direction of the fusing belt, and heat conductivity of the heat-conductive member may be higher than heat conductivity of the fusing frame.

An image forming apparatus according to the present disclosure includes the fusing device.

According to the present disclosure, it is possible to suppress overheating of the fusing belt.

DESCRIPTION OF THE PREFERRED EMBODIMENTS

A description will hereinafter be made on embodiments of the present disclosure with reference to the accompanying drawings. Common components in the embodiments, which will be described below, will be denoted by the same reference sign, and an overlapping description thereon will not be made.

First Embodiment

Image Forming Apparatus

First, a description will be made on a configuration of an image forming apparatus A in a first embodiment.

Figure 1:
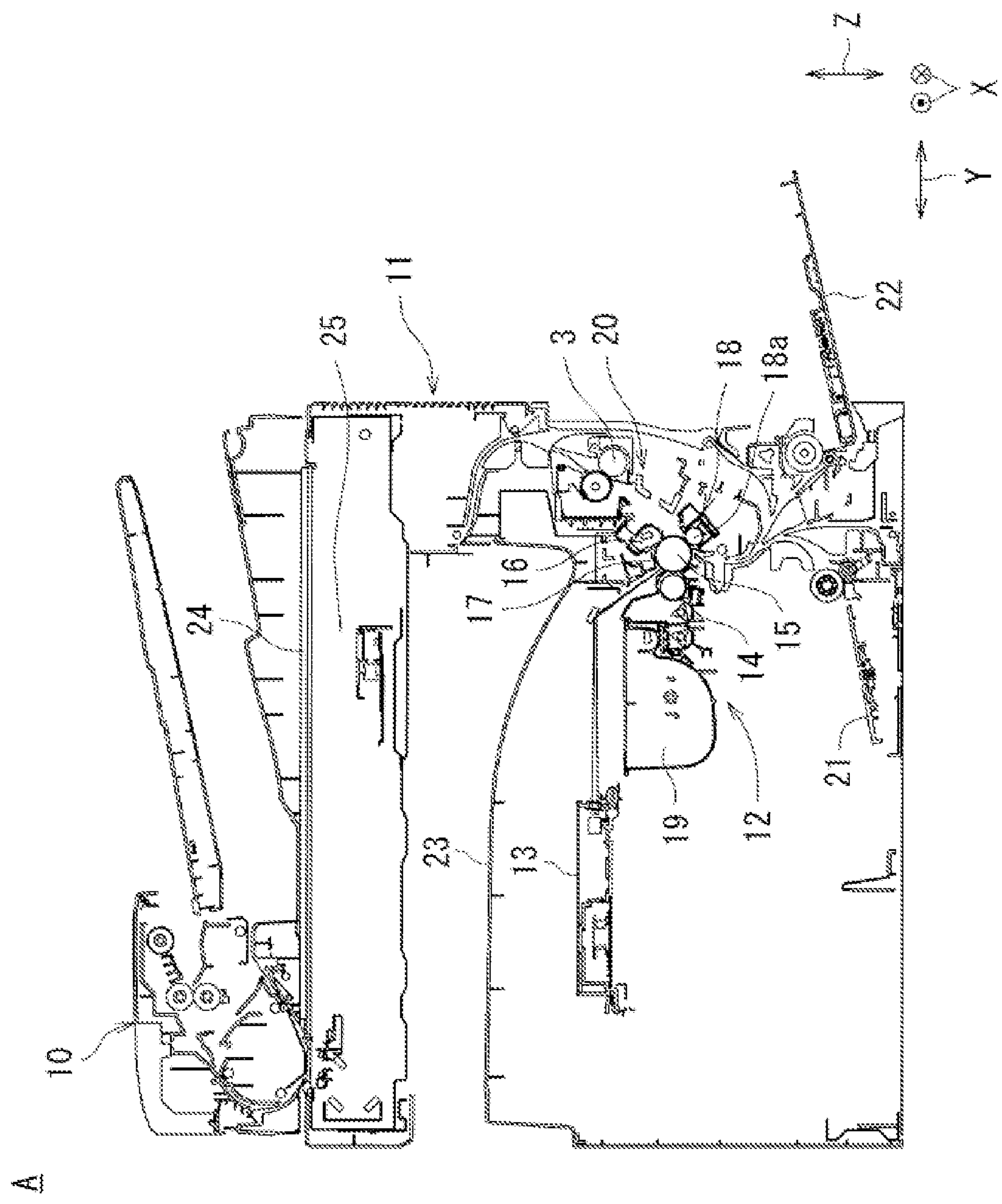
FIG. 1 is a schematic cross-sectional view in which an image forming apparatus in a first embodiment is seen from front.

FIG. 1 is a schematic cross-sectional view in which the image forming apparatus A in the first embodiment is seen from front. In the drawing, a reference sign X indicates a front-rear direction (a depth direction) of the image forming apparatus A, a reference sign Y indicates a right-left direction of the image forming apparatus A, and a reference sign Z indicates an up-down direction of the image forming apparatus A. These settings will be the same in the embodiments, which will be described below.

The image forming apparatus A is an image forming apparatus that forms a monochrome image on a sheet by an electrophotographic method in accordance with image data read by an image reader 25 or image data transmitted from the outside.

The image forming apparatus A includes a document feeder 10 and an image forming apparatus body 11 (see FIG. 1). The image forming apparatus body 11 is provided with an image former 12 and a paper transport system 20.

The image former 12 includes an exposure device 13, a developing device 14, an image carrier 15, a cleaner 16, an electrifier 17, a transferer 18, a toner cartridge device 19, and a fusing device 3 (see FIG. 1). The transferer 18 has a transfer roller 18*a*. When a transfer bias is applied to the transfer roller 18*a*, a toner image that is formed on the image carrier 15 is transferred onto the sheet. A detailed configuration of the fusing device 3 will be described below.

The paper transport system 20 includes a paper feed tray 21, a manual feed tray 22, a paper receiving tray 23, and a transport roller (not illustrated) that is provided along a sheet transport path S.

A document placement table 24, which is formed of transparent glass and on which a document is placed, is formed in an upper portion of the image forming apparatus body 11. The image reader 25 for reading an image of the document is provided under the document placement table 24. The document feeder 10 is provided above the document placement table 24. The image of the document that is read by the image reader 25 is sent as image data to the image forming apparatus body 11, and an image that is formed in the image forming apparatus body 11 on the basis of the image data is recorded onto the sheet.

The above image forming apparatus A executes printing of the image on the sheet as follows. First, the sheet is supplied from the paper feed tray 21 or the manual feed tray 22. The sheet is transported to the transferer 18 by the transfer roller. Next, the transferer 18 transfers the toner image, which is formed by the image former 12, onto the sheet. Thereafter, the fusing device 3 melts unfused toner on the sheet with heat and fuses the unfused toner thereon, and the sheet is then ejected onto the paper receiving tray 23 by the transport roller and an ejection roller (not illustrated). In this way, the image forming apparatus A completes a series of printing operation.

The image forming apparatus A may be a multi-color image forming apparatus. In this case, such a configuration can be adopted that the image former 12 is provided for each of plural colors (for example, colors such as black (K), cyan (C), magenta (M), and yellow (Y)) and toner images formed by these image formers 12 are sequentially transferred and superposed onto a primary transfer belt.

Fusing Device

Next, a description will be made on the fusing device 3.

Figure 2:
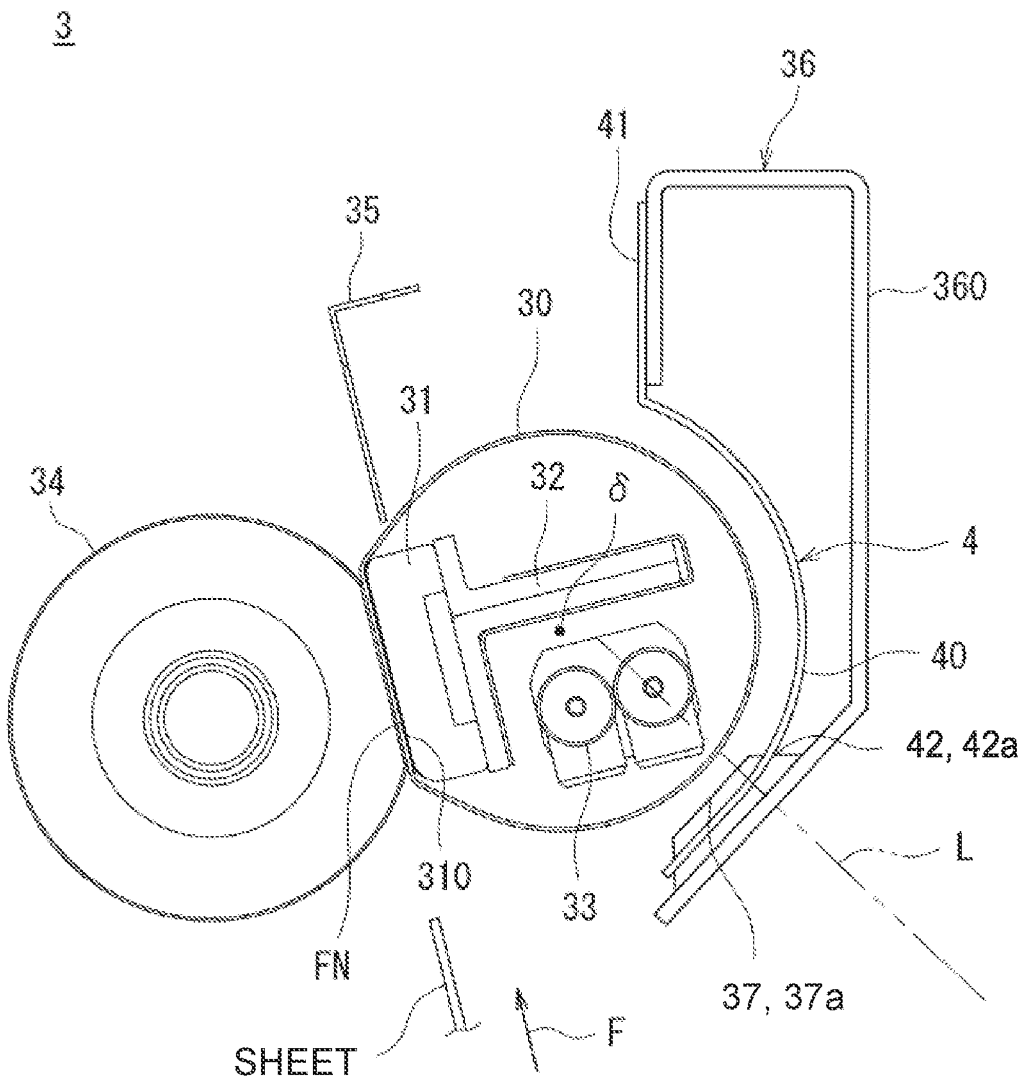
FIG. 2 is a schematic cross-sectional view in which a fusing device in the first embodiment is seen from the front.
Figure 3:
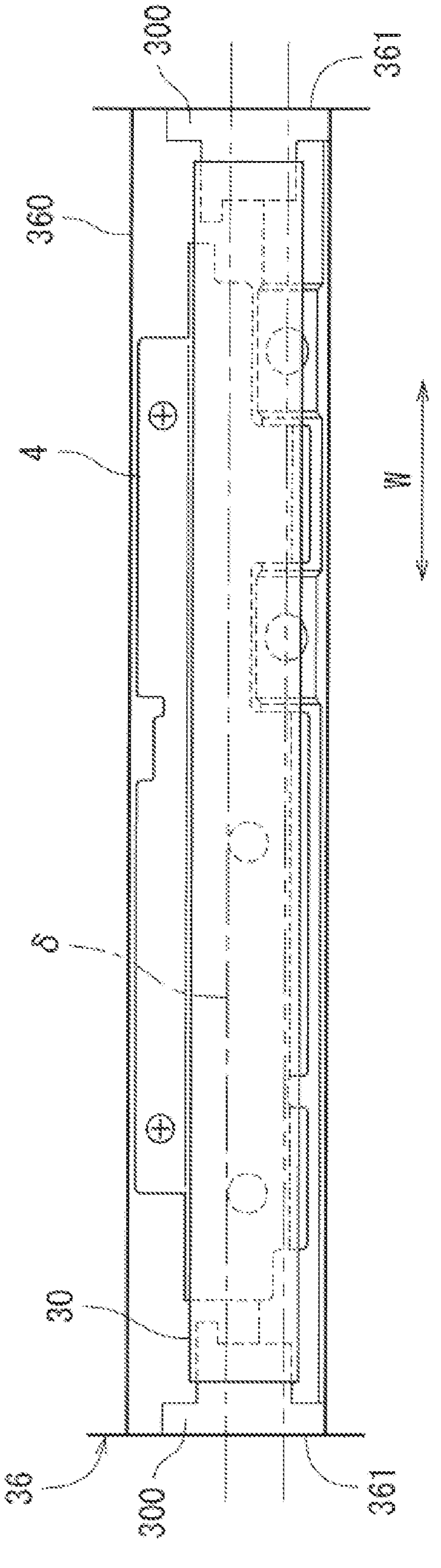
FIG. 3 is a schematic side view partially illustrating the fusing device in FIG. 2.

FIG. 2 is a schematic cross-sectional view in which the fusing device 3 in the first embodiment is seen from the front. FIG. 3 is a schematic side view partially illustrating the fusing device 3. In FIG. 3, a nip forming member 31, a support member 32, and a heat source 33 inside a fusing belt 30 are not illustrated. In addition, in FIG. 3 and FIG. 4, thicknesses of a fusing frame 36 and a heat-conductive member 4, which will be described below, are not illustrated.

In this embodiment, the fusing device 3 includes the fusing belt 30, the nip forming member 31, the support member 32, the heat source 33, a pressure roller 34, a release member 35, the fusing frame 36, and a thermostat 37 (see FIG. 2).

The fusing belt 30 is a heat-resistant belt that is formed in an endless (cylindrical) shape and has a width in a width direction W that is orthogonal to a sheet transport direction F. The fusing belt 30 is provided to be rotatable about a rotation axis δ that is along the width direction W (see FIG. 2 and FIG. 3). In this embodiment, the width direction W of the fusing belt 30 is along the front-rear direction X of the image forming apparatus A. Both ends of the fusing belt 30 are supported by the fusing frame 36 via a pair of holders 300, each of which abuts an inner circumferential surface of the fusing belt 30 to hold the respective end of the fusing belt 30.

For example, the fusing belt 30 is constructed of a base material that is formed of metal such as nickel and has a predetermined thickness (for example, about 30 μm to 100 μm); and a resin layer and a surface layer (a release layer) that are provided on the base material, are respectively formed of silicone rubber or the like and a PFA tube or the like, and have a predetermined thickness (for example, about 100 μm to 300 μm). The width of the fusing belt 30 is set to about 340 mm to 360 mm, for example. An inner diameter of the fusing belt 30 is set to about 30 mm, for example. The fusing belt 30 is heated at a predetermined fusing temperature (for example, 200° C. to 250° C.) by the heat source 33.

The nip forming member 31 forms a fusing nip area FN between the fusing belt 30 and the pressure roller 34 and is disposed on the inner circumferential surface of the fusing belt 30 (see FIG. 2). The nip forming member 31 is formed in a long plate shape that extends along the rotation axis δ of the fusing belt 30. For example, the nip forming member 31 is formed of a highly rigid, heat-resistant resin material [for example, a liquid crystal polymer (LCP), polyether ether ketone (PEEK), poly phenylene sulfide (PPS), or the like] or a highly-elastic, heat-resistant resin material (for example, a rubber material). A length of the nip forming member 31 is set to be substantially the same as the width of the fusing belt 30.

A slide sheet 310 is provided between the nip forming member 31 and the fusing belt 30 to reduce sliding resistance between the nip forming member 31 and the fusing belt 30 (see FIG. 2). The slide sheet 310 adheres to the nip forming member 31 by an adhesive or an adhesive member. For example, the slide sheet 310 is formed of a member (for example, a glass cloth sheet) that is obtained by applying a fluororesin such as polytetrafluoroethylene (PTFE) to a glass fiber material (for example, glass cloth). A thickness of the slide sheet 310 is set to about 0.1 mm to 0.5 mm, for example.

The support member 32 supports the nip forming member 31 while pressing the nip forming member 31 against the inner circumferential surface of the fusing belt 30. The support member 32 is formed in a T-shape in a cross-sectional view that is seen in a direction of the rotation axis δ of the fusing belt 30, and is provided along the rotation axis δ of the fusing belt 30 (see FIG. 2). The nip forming member 31 is fixed to a bottom surface of the support member 32. Both ends of the support member 32 are supported by the fusing frame 36.

The heat source 33 heats the fusing belt 30 and is disposed inside the fusing belt 30 (see FIG. 2). The heat source 33 is constructed of a lamp heater such as a halogen lamp, for example. The heat source 33 is controlled by a controller (not illustrated). A length of the heat source 33 is set to be substantially the same as the width of the fusing belt 30.

The pressure roller 34 is in pressure contact with the fusing belt 30 from the outer side thereof toward the nip forming member 31, forms the fusing nip area FN between the pressure roller 34 and the fusing belt 30, and is provided at a position opposing the nip forming member 31 with the fusing belt 30 being held therebetween. The pressure roller 34 is rotatably supported by a pressure frame (not illustrated) and is rotationally driven by a drive source such as a motor (not illustrated). For example, the pressure roller 34 is constructed of: a cylindrical core material that is formed of metal such as aluminum; and an elastic material such as rubber that covers a surface of the core material. When being rotationally driven by the drive source and abutting the fusing belt 30, the pressure roller 34 forms the fusing nip area FN, transmits drive power to the fusing belt 30 via the nip forming member 31, and thereby causes the fusing belt 30 to be rotationally driven.

The release member 35 releases the sheet that has passed between the fusing belt 30 and the pressure roller 34 from the fusing belt 30, and is provided on a downstream side of the fusing belt 30 in the sheet transport direction F (see FIG. 2). The release member 35 inhibits a situation where the sheet that has passed between the fusing belt 30 and the pressure roller 34 is wrapped around the fusing belt 30.

Figure 4:
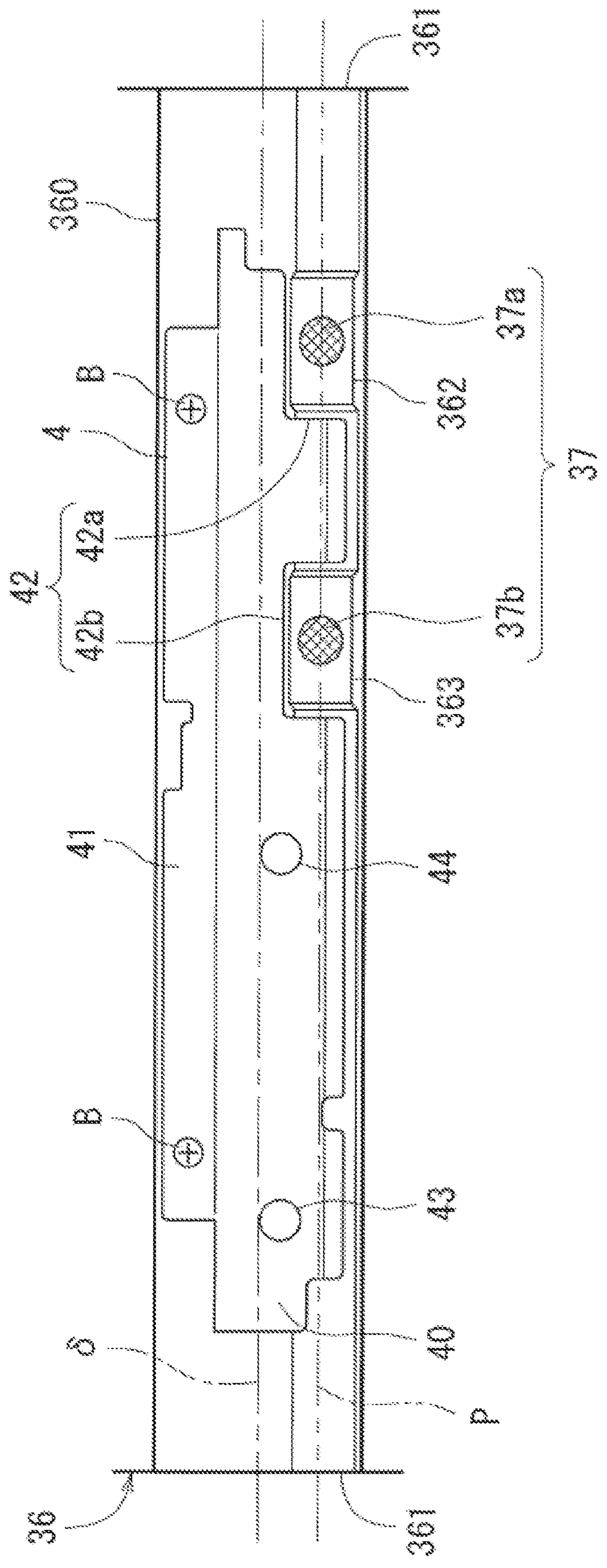
FIG. 4 is a schematic side view illustrating a fusing frame and a heat-conductive member.

FIG. 4 is a schematic side view illustrating the fusing frame 36 and the heat-conductive member 4.

The fusing frame 36 rotatably supports both of the ends of the fusing belt 30, and has: a main plate 360 that is disposed along the direction of the rotation axis δ of the fusing belt 30; and paired holding plates 361 that oppose each other at ends on both sides of the main plate 360 (see FIG. 3 and FIG. 4). The main plate 360 corresponds to the “plate” in the claims. In this embodiment, the main plate 360 is bent in a manner to cover a lateral side of an outer circumference of the fusing belt 30 (see FIG. 2). Attachments 362, 363, to each of which the thermostat 37 is attached, are provided in a lower end portion of the main plate 360 (see FIG. 4). The paired holding plates 361 are fixed to the main plate 360 by fastening members such as screws (not illustrated).

The thermostat 37 shuts off electric power supply to the heat source 33 when a temperature of the fusing belt 30 becomes a predetermined temperature. More specifically, the thermostat 37 is electrically connected to an electric power line (not illustrated) that supplies electric power to the heat source 33. When the temperature of the fusing belt 30 becomes a predetermined reaction temperature (actuation temperature or rapid temperature) (for example, 190° C.), the thermostat 37 directly shuts off the electric power supply to the heat source 33 in order to protect the fusing belt 30. The thermostat 37 includes: a thermostat 37*a* that is provided to the attachment 362 at the end of the main plate 360 of the fusing frame 36 in the direction of the rotation axis δ of the fusing belt 30; and a thermostat 37*b* that is provided to the attachment 363 on the inner side from the attachment 362 in the direction of the rotation axis δ of the fusing belt 30.

The attachments 362, 363 of the main plate 360 bulge out toward the fusing belt 30 side. In this way, the thermostats 37*a*, 37*b* can be brought close to an area that is closest to the heat source 33 and a temperature of which becomes the highest of an area of the fusing belt 30.

By the way, in the fusing device 3 described above, it is requested to avoid a situation where the fusing belt 30 is overheated by the heat source 33. In order to meet such a request, the fusing device 3 includes in addition to the above configuration, the heat-conductive member 4 that is disposed on the lateral side of the outer circumference of the fusing belt 30 (see FIG. 2 to FIG. 4). A description will hereinafter be made on the heat-conductive member 4.

Figure 5:
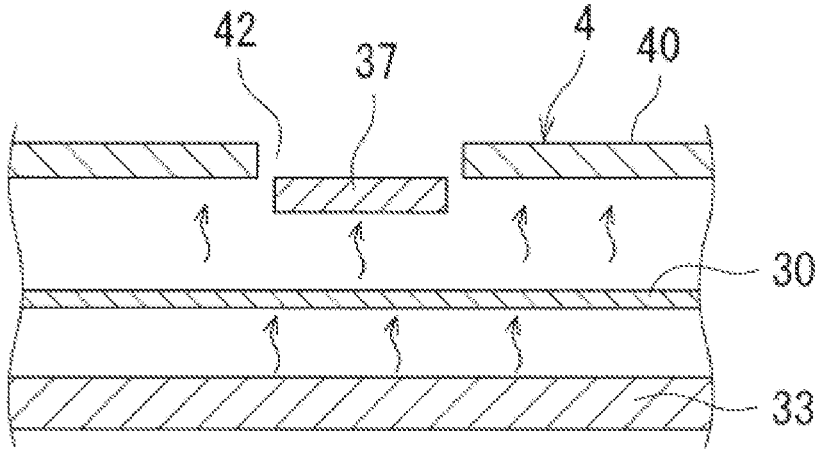
FIG. 5 is a schematic cross-sectional view in which a fusing belt and surroundings thereof are enlarged.

FIG. 5 is a schematic cross-sectional view in which the fusing belt 30 and surroundings thereof are enlarged. In FIG. 5, curved arrows conceptually indicate heat transfer.

In this embodiment, the heat-conductive member 4 is disposed between the fusing belt 30 and the main plate 360 of the fusing frame 36, and extends over a width area in the direction of the rotation axis δ of the fusing belt 30 (see FIG. 2 to FIG. 4). Here, “extends over the width area” includes not only a case where the heat-conductive member 4 has an equivalent width to that of the fusing belt 30 but also a case where the heat-conductive member 4 has a width approximating that of the fusing belt 30. The heat-conductive member 4 is formed of a metal plate having a predetermined thickness (for example, about 0.5 mm).

The heat-conductive member 4 has: a curved portion 40 that is curved along an outer circumferential surface of the fusing belt 30 in a cross-sectional view that is seen in the direction of the rotation axis δ of the fusing belt 30; a fixed portion 41 that is continuously connected to an upper end edge of the curved portion 40 and is fixed to the main plate 360 of the fusing frame 36; and an opening 42 that is opened to the fusing belt 30 side at a lower end of the curved portion 40 (see FIG. 2 and FIG. 4).

The curved portion 40 is separated from the outer circumferential surface of the fusing belt 30 by a predetermined distance (for example, about 3 mm). In a central portion of the curved portion 40, perforation holes 43, 44 for exposing a temperature sensor (not illustrated) that measures a temperature of an outer surface of the fusing belt 30 in a non-contact manner are perforated.

The fixed portion 41 is fixed to the main plate 360 of the fusing frame 36 by a fastening member B such as a screw, for example.

The opening 42 includes openings 42*a*, 42*b* that are recessed at a lower end edge of the curved portion 40 in a manner to respectively correspond to the thermostats 37*a*, 37*b*. The thermostats 37*a*, 37*b* are respectively provided at positions facing the openings 42*a*, 42*b*. In this way, each of the thermostats 37*a*, 37*b* can be actuated for the temperature of the fusing belt 30 with a high degree of accuracy. The thermostat 37*a*, which faces the opening 42*a*, is disposed on an extension line of an imaginary straight line L that connects the heat source 33 and the fusing belt 30 by the shortest distance (see FIG. 2). In this way, the thermostat 37*a* is brought close to the area that is closest to the heat source 33 and the temperature of which becomes the highest of the area of the fusing belt 30. Thus, the thermostat 37*a* can be actuated for the temperature of the fusing belt 30 with the high degree of accuracy. Also, in the case where the thermostat 37*a* is disposed near the extension line of the imaginary straight line L, similar to the above, the thermostat 37*a* can be actuated for the temperature of the fusing belt 30 with the high degree of accuracy.

As illustrated in FIG. 5, the heat-conductive member 4 as described above transfers heat of the fusing belt 30, which is generated by heating of the heat source 33, to the curved portion 40 of the heat-conductive member 4 via air on the lateral side of the outer circumference of the fusing belt 30. Here, the heat of the fusing belt 30 includes not only heat accumulated in the fusing belt 30 but also heat stagnating near the outer surface of the fusing belt 30. In addition, since the heat-conductive member 4 extends over the width area in the direction of the rotation axis δ of the fusing belt 30, the heat transfer from the fusing belt 30 to the heat-conductive member 4 as illustrated in FIG. 5 is promoted over the width area in the direction of the rotation axis δ of the fusing belt 30. As a result, the heat of the fusing belt 30 is absorbed by the heat-conductive member 4 in the entire width area in the direction of the rotation axis δ of the fusing belt 30. Thus, it is possible to suppress overheating of the fusing belt 30.

Suppressing overheating of the fusing belt 30 helps achieve a purpose of the thermostat 37 to protect the fusing belt 30.

In this embodiment, the heat-conductive member 4 (more specifically, the curved portion 40) is disposed near the extension line of the imaginary straight line L that connects the heat source 33 and the fusing belt 30 by the shortest distance (see FIG. 2). As a result, heat in the area that is closest to the heat source 33 and the temperature of which becomes the highest of the area of the fusing belt 30 is absorbed by the heat-conductive member 4. Thus, it is possible to efficiently suppress overheating of the fusing belt 30. Also, in the case where the heat-conductive member 4 is disposed on the extension line of the imaginary straight line L, similar to the above, it is possible to efficiently suppress overheating of the fusing belt 30.

In this embodiment, the heat-conductive member 4 is disposed on an imaginary straight line P that connects the heat source 33 and the fusing belt 30 by the shortest distance at any position in the direction of the rotation axis δ of the fusing belt 30 (see FIG. 4). In other words, the imaginary straight line P indicates a point of the heat-conductive member 4 that is close to the heat source 33. In this way, the heat-conductive member 4 absorbs heat in an area that is close to the heat source 33 and a temperature of which becomes high in the entire width area in the direction of the rotation axis δ of the fusing belt 30. Thus, it is possible to efficiently suppress overheating of the fusing belt 30. Also, in the case where the heat-conductive member 4 is disposed near the imaginary straight line P, similar to the above, it is possible to efficiently suppress overheating of the fusing belt 30.

In this embodiment, the heat of the fusing belt 30 is preferentially transferred to the heat-conductive member 4 over the main plate 360 due to the structure in which the heat-conductive member 4 is disposed between the fusing belt 30 and the main plate 360 of the fusing frame 36 as described above, that is, the structure in which the heat-conductive member 4 is located closer to the fusing belt 30 than to the main plate 360. In this way, it is possible to efficiently suppress overheating of the fusing belt 30 by the heat-conductive member 4. Furthermore, due to the structure in which the heat-conductive member 4 is disposed between the fusing belt 30 and the main plate 360 of the fusing frame 36 as described above, such an effect is also exerted that a space between the fusing belt 30 and the fusing frame 36 can be used effectively.

In addition, the heat-conductive member 4 only needs to absorb the heat of the fusing belt 30 via the air on the lateral side of the outer circumference of the fusing belt 30, so as to be able to suppress overheating of the fusing belt 30. For this reason, the heat-conductive member 4 does not always have to be formed of a metal material but only needs to be formed of a material having higher heat conductivity than the air. For example, the heat-conductive member 4 may be formed of a resin material containing metal filler. Needless to say, it is possible to efficiently suppress overheating of the fusing belt 30 when a material having superior heat conductivity, such as aluminum or copper, is adopted for the heat-conductive member 4.

The heat-conductive member 4 may integrally be formed with the fusing frame 36. In this way, it is possible to cut cost by reducing the number of components of the fusing device 3.

Second Embodiment

A description will hereinafter be made on different points of a second embodiment from the first embodiment.

Figure 6:
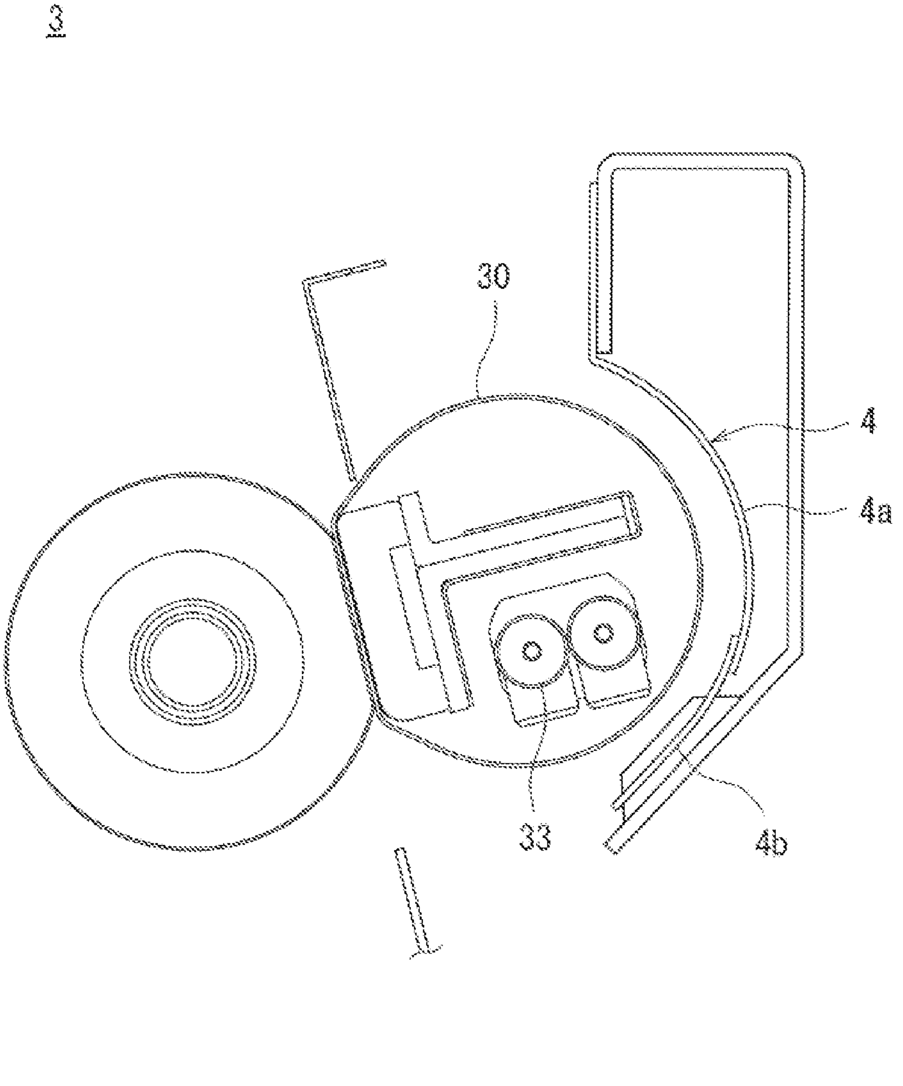
FIG. 6 is a schematic cross-sectional view in which a fusing device in a second embodiment is seen from the front.

FIG. 6 is a schematic cross-sectional view in which the fusing device 3 in the second embodiment is seen from the front.

In the second embodiment, the heat-conductive member 4 is configured to include a first heat-conductive plate 4*a* and a second heat-conductive plate 4*b* that are formed from mutually different materials (see FIG. 6). The first heat-conductive plate 4*a* is fixed to the main plate 360 of the fusing frame 36. The second heat-conductive plate 4*b* is coupled to a lower end of the first heat-conductive plate 4*a* by a fastening member (not illustrated) such as a screw, and is curved along an outer circumferential surface of an area close to the heat source 33 of the area of the fusing belt 30. The first heat-conductive plate 4*a* is formed from an aluminum alloy or the like, for example. The second heat-conductive plate 4*b*, which is closer to the heat source 33 than the first heat-conductive plate 4*a*, is formed from a material, such as copper, having superior heat conductivity than the first heat-conductive plate 4*a*. In other words, compared to the other area of the area of the fusing belt 30, the heat of the area that is close to the heat source 33 and the temperature of which becomes high is efficiently absorbed by the second heat-conductive plate 4*b*. For this reason, compared to the case of the first embodiment described above, it is possible to efficiently suppress overheating of the fusing belt 30. Just as described, the heat-conductive member 4 is constructed of the plural members (the first heat-conductive plate 4*a* and the second heat-conductive plate 4*b*) that are formed from the mutually different materials. Thus, it is possible to increase a degree of freedom of design.

Third Embodiment

A description will hereinafter be made on different points of a third embodiment from the first embodiment.

Figure 7:
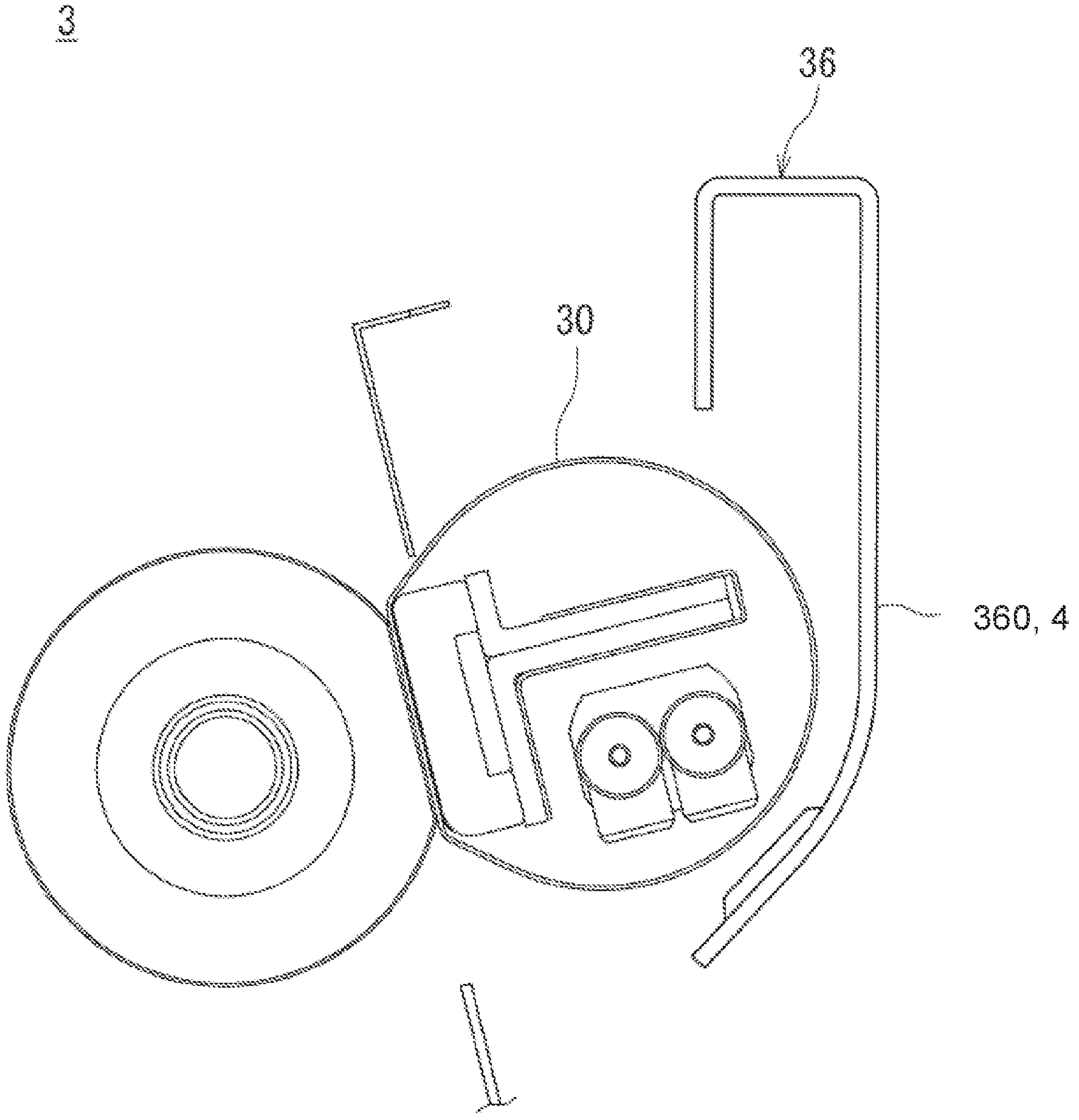
FIG. 7 is a schematic cross-sectional view in which a fusing device in a third embodiment is seen from the front.

FIG. 7 is a schematic cross-sectional view in which the fusing device 3 in the third embodiment is seen from the front. In FIG. 7, the rotational axis δ is not illustrated.

In the third embodiment, the main plate 360 of the fusing frame 36 is disposed on the lateral side of the outer circumference of the fusing belt 30 and, compared to the main plate 360 in the first embodiment, is formed to be close to the fusing belt 30 (see FIG. 7). In addition, the main plate 360 extends over the width area in the direction of the rotation axis δ of the fusing belt 30.

In the third embodiment, the main plate 360 functions as the heat-conductive member 4 in the first embodiment. In other words, similar to the case where the heat-conductive member 4 in the first embodiment is used, the heat transfer from the fusing belt 30 to the main plate 360 is promoted over the width area in the direction of the rotation axis δ of the fusing belt 30, and the heat of the fusing belt 30 is absorbed by the main plate 360 in the entire width area in the direction of the rotation axis δ of the fusing belt 30. In this way, compared to the cases of the above embodiments, it is possible to cut the cost by reducing the number of the components of the fusing device 3 while exerting the effect of suppressing overheating of the fusing belt 30.

Fourth Embodiment

In a fourth embodiment, the heat-conductive member 4 is formed of iron. Meanwhile, the main plate 360 of the fusing frame 36 is formed of stainless steel. In other words, the heat conductivity (about 80 W/m·K) of the heat-conductive member 4 is higher than the heat conductivity (about 16 W/m·K) of the main plate 360.

For this reason, unlike the structure in which the heat-conductive member 4 is closer to the fusing belt 30 than to the main plate 360 as in the first embodiment described above, even when a structure in which the heat-conductive member 4 and the main plate 360 are separated from the outer circumferential surface of the fusing belt 30 by the same distance is adopted, the heat of the fusing belt 30 is preferentially transferred to the heat-conductive member 4 having the superior heat conductivity over the main plate 360. In this way, it is possible to efficiently suppress overheating of the fusing belt 30 by the heat-conductive member 4.

It should be noted that the embodiments and the examples disclosed herein are merely illustrated as examples in all respects and are not intended to provide any basis for limited interpretation. Therefore, the technical scope of the present disclosure should be construed not only on the basis of the embodiments and the examples described above but on the basis of the claims as attached hereto. Furthermore, any changes and modifications within the meaning and the scope equivalent to the claims fall within the scope of the present disclosure.

What is claimed is:

1. A fusing device comprising:

an endless rotatable fusing belt;

a nip forming member that is disposed on an inner circumferential surface of the fusing belt;

a pressure roller that is in pressure contact with the nip forming member from an outer side of the fusing belt and forms a fusing nip area between the pressure roller and the fusing belt;

a heat source that is disposed inside the fusing belt and heats the fusing belt;

a heat-conductive member that is disposed on a lateral side of an outer circumference of the fusing belt; and a thermostat that shuts off electric power supply to the heat source when a temperature of the fusing belt becomes a predetermined temperature, wherein the heat-conductive member extends over a width area in a rotation axis direction of the fusing belt and has an opening, and the thermostat is provided at a position facing the opening.

2. The fusing device according to claim 1, wherein the heat-conductive member is disposed on an extension line of an imaginary straight line or near the extension line, the imaginary straight line connecting the heat source and the fusing belt by the shortest distance.

3. The fusing device according to claim 2, wherein the heat-conductive member is disposed on an imaginary straight line or near the imaginary straight line that connects the heat source and the fusing belt by the shortest distance at any position in the rotation axis direction of the fusing belt.

4. The fusing device according to claim 1, wherein the thermostat is provided on an extension line of an imaginary straight line or near the extension line, the imaginary straight line connecting the heat source and the fusing belt by the shortest distance.

5. The fusing device according to claim 1, further comprising:

a fusing frame that rotatably supports both ends of the fusing belt, wherein the fusing frame has a plate that is disposed on the lateral side of the outer circumference of the fusing belt, and the plate of the fusing frame extends over the width area in the rotation axis direction of the fusing belt and functions as the heat-conductive member.

6. The fusing device according to claim 1, further comprising:

a fusing frame that rotatably supports both ends of the fusing belt, wherein the fusing frame has a plate that is disposed along the rotation axis direction of the fusing belt, and heat conductivity of the heat-conductive member is higher than heat conductivity of the fusing frame.

7. An image forming apparatus comprising:

the fusing device according to claim 1.

8. A fusing device comprising:

an endless rotatable fusing belt;

a nip forming member that is disposed on an inner circumferential surface of the fusing belt;

a pressure roller that is in pressure contact with the nip forming member from an outer side of the fusing belt and forms a fusing nip area between the pressure roller and the fusing belt;

a heat source that is disposed inside the fusing belt and heats the fusing belt; and a heat-conductive member that is disposed on a lateral side of an outer circumference of the fusing belt, wherein the heat-conductive member extends over a width area in a rotation axis direction of the fusing belt and is constructed of a plurality of members that is formed of mutually different materials.

9. The fusing device according to claim 8, wherein the heat-conductive member is disposed on an extension line of an imaginary straight line or near the extension line, the imaginary straight line connecting the heat source and the fusing belt by the shortest distance.

10. The fusing device according to claim 9, wherein the heat-conductive member is disposed on an imaginary straight line or near the imaginary straight line that connects the heat source and the fusing belt by the shortest distance at any position in the rotation axis direction of the fusing belt.

11. The fusing device according to claim 10, wherein the thermostat is provided on an extension line of an imaginary straight line or near the extension line, the imaginary straight line connecting the heat source and the fusing belt by the shortest distance.

12. The fusing device according to claim 8, further comprising:

a thermostat that shuts off electric power supply to the heat source when a temperature of the fusing belt becomes a predetermined temperature, wherein the heat-conductive member has an opening, and the thermostat is provided at a position facing the opening.

13. An image forming apparatus comprising:

the fusing device according to claim 6.

14. A fusing device comprising:
an endless rotatable fusing belt;
a nip forming member that is disposed on an inner circumferential surface of the fusing belt;
a pressure roller that is in pressure contact with the nip forming member from an outer side of the fusing belt and forms a fusing nip area between the pressure roller and the fusing belt;
a heat source that is disposed inside the fusing belt and heats the fusing belt;
a heat-conductive member that is disposed on a lateral side of an outer circumference of the fusing belt; and
a fusing frame that rotatably supports both ends of the fusing belt, wherein
the heat-conductive member extends over a width area in a rotation axis direction of the fusing belt,
the fusing frame has a plate that is disposed along the rotation axis direction of the fusing belt, and
the heat-conductive member is disposed between the fusing belt and the plate.

15. The fusing device according to claim 14, wherein
the heat-conductive member is integrally formed with the fusing frame.

16. The fusing device according to claim 14, wherein
the heat-conductive member is disposed on an extension line of an imaginary straight line or near the extension line, the imaginary straight line connecting the heat source and the fusing belt by the shortest distance.

17. The fusing device according to claim 16, wherein
the heat-conductive member is disposed on an imaginary straight line or near the imaginary straight line that connects the heat source and the fusing belt by the shortest distance at any position in the rotation axis direction of the fusing belt.

18. The fusing device according to claim 14, further comprising:
a thermostat that shuts off electric power supply to the heat source when a temperature of the fusing belt becomes a predetermined temperature, wherein
the heat-conductive member has an opening, and
the thermostat is provided at a position facing the opening.

19. An image forming apparatus comprising:
the fusing device according to claim 14.

* * * * *